US007065944B1

(12) United States Patent
Steele

(10) Patent No.: US 7,065,944 B1
(45) Date of Patent: Jun. 27, 2006

(54) LEAF BLOWER DISPERSING APPLICATOR

(76) Inventor: Timothy Dale Steele, 797 Scott Center Rd., Fulton, MS (US) 38843

(*) Notice: Subject to any disclaimer, the term of this patent is extended or adjusted under 35 U.S.C. 154(b) by 0 days.

(21) Appl. No.: 10/747,759

(22) Filed: Dec. 29, 2003

(51) Int. Cl.
*A01D 57/26* (2006.01)

(52) U.S. Cl. ............................ 56/1; 239/289; 239/304

(58) Field of Classification Search ...................... 56/1, 56/2; 222/195, 325, 333, 630, 637; 406/38, 406/136–146; 124/48–50
See application file for complete search history.

(56) References Cited

U.S. PATENT DOCUMENTS

| | | | | |
|---|---|---|---|---|
| 165,276 | A | 7/1875 | Van Patten | |
| 346,650 | A | 3/1886 | Freeman | |
| 1,475,957 | A | 12/1923 | Lemons | |
| 1,755,329 | A | 4/1930 | McCormack | |
| 2,112,603 | A | 3/1938 | Perron | |
| 2,663,464 | A | 12/1953 | Lahonen | |
| 3,174,251 | A | 3/1965 | West | |
| 3,304,647 | A | 2/1967 | Szekely | |
| 4,071,170 | A | 1/1978 | Gunzel, Jr. et al. | |
| 4,089,441 | A | 5/1978 | Cole et al. | |
| 5,226,567 | A | 7/1993 | Sansalone | |
| 5,392,996 | A | 2/1995 | Ussery | |
| 5,429,278 | A * | 7/1995 | Sansalone | 222/195 |
| 5,887,578 | A * | 3/1999 | Backeris et al. | 124/49 |
| 5,947,384 | A | 9/1999 | McCauley | |
| 5,964,420 | A | 10/1999 | Hampton | |
| 6,409,097 | B1 * | 6/2002 | McCauley | 239/289 |

FOREIGN PATENT DOCUMENTS

| | | |
|---|---|---|
| GB | 2.195.323 | 4/1988 |

* cited by examiner

*Primary Examiner*—Árpád Fábián Kovács
(74) *Attorney, Agent, or Firm*—Michael I Kroll

(57) ABSTRACT

The present invention 10 is for a device for attachment to a leaf blower 12 having a conduit 23 with a container 18 having a reservoir with particulate matter 30 therein in communication with the conduit having a control 24, 26 for metering the amount of gravity fed particulate matter dispensed into a pressurized air stream 32. Also shown is a shoulder strap 34 with a flexible conduit 23 extending therefrom whereby the device can be attached to the aforementioned conduit for metering the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more.

9 Claims, 19 Drawing Sheets

LEAF BLOWER DISPERSING APPLICATOR

BACKGROUND OF THE INVENTION

1. Field of the Invention

The present invention relates generally to attachments for leaf blowers and, more specifically, to a device for attachment to a leaf blower having a conduit with a container having a reservoir with particulate matter in communication with the conduit having control means for metering the amount of gravity fed particulate matter dispensed into a pressurized air stream. Also a container having means for attaching a shoulder strap with a flexible conduit extending therefrom whereby the device can be attached to the aforementioned conduit for metering the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more.

2. Description of the Prior Art

There are other attachment devices designed for dispensing particulate matter. Typical of these is U.S. Pat. No. 165,276 issued to Van Patten on Jul. 6, 1875.

Another patent was issued to Freeman on Aug. 3, 1886 as U.S. Pat. No. 346,650. Yet another U.S. Pat. No. 1,475,957 was issued to Lemons on Dec. 4, 1923 and still yet another was issued on Apr. 22, 1930 to McCormack as U.S. Pat. No. 1,755,329.

Another patent was issued to Perron on Mar. 29, 1938 as U.S. Pat. No. 2,112,603. Yet another U.S. Pat. No. 2,663,464 was issued to Lahonen on Dec. 22, 1953. Another was issued to West on Mar. 23, 1965 as U.S. Pat. No. 3,174,251 and still yet another was issued on Feb. 21, 1967 to Szekely U.S. Pat. No. 3,304,647.

Another patent was issued to Gunzel, Jr., et al. on Jan. 31, 1978 as U.S. Pat. No. 4,071,170. Yet another U.S. Pat. No. 4,089,441 was issued to Cole, et al. on May 16, 1978. Another was issued to Sansalone on Jul. 13, 1993 as U.S. Pat. No. 5,226,567 and still yet another was issued on Feb. 28, 1995 to Ussery as U.S. Pat. No. 5,392,996.

Another patent was issued to Hampton on Oct. 12, 1999 as U.S. Pat. No. 5,964,420. Yet another U.S. Pat. No. 5,947,384 was issued to McCauley on Sep. 7, 1999. Another was issued to Dirkse et al on Apr. 7, 1988 as UK Patent No. GB2,195,323.

U.S. Pat. No. 165,276

Inventor: William J. Van Patten

Issued: Jul. 6, 1875

A powder-box constructed in one piece and having a cone-shaped bottom, a vertical aperture, connecting with a horizontal aperture, the latter being formed with shoulder at one end, and a funnel-shaped outlet at the other end.

U.S. Pat. No. 345,650

Inventor: Edward F. Freeman

Issued: Aug. 13, 1886

In a sand blast instrument, the combination of the primary bellows, the secondary bellows connected therewith, as described, and a sand-box provided with an ejecting nozzle or spreader, substantially as described.

U.S. Pat. No. 1,475,957

Inventor: Joseph F. Lemons

Issued: Dec. 4, 1923

A portable device comprising a casing having an inlet and a discharge opening, a fan member journaled in the casing, means for rotating said fan member, a reservoir, a pipe connecting said reservoir and one of said openings, and means for suspending said device from the operator whereby substantially one-half of the weight of said device will be positioned forwardly and the other half rearwardly of the operator.

U.S. Pat. No. 1,755,329

Inventor: Lawrence E. McCormack

Issued: Apr. 22, 1930

In a pneumatic mortar gun, a receptacle having a discharge opening in the bottom end and convergent toward said discharge opening, a T-fitting connected with said bottom and forming a passageway crosswise of said discharge opening and communicating therewith, discharge nozzle means connected with one end of said T-fitting, and affording an abrupt annular shoulder within said T-fitting, a reducer fitting at the other end of said T-fitting, pressure inlet conduit means connected with said reducer fitting, and a relatively small injector tube disposed axially within said T-fitting and supported by said reducer fitting and communicating with said pressure inlet conduit means, the discharge end of said injector tube extending beyond the inlet opening to said receptacle and terminating just beyond said abrupt annular shoulder.

U.S. Pat. No. 2,112,603

Inventor: Walter C. Perron

Issued: Mar. 29, 1938

A dust disseminating device including a forward most blower fan casing having a delivery spout leading tangentially from its bottom, a hopper close to and behind the casing having means for feeding material laterally therefrom and from the bottom, and a short horizontal conduit establishing communication between the hopper and the fan casing and delivering centrally of the fan, whereby the material is assisted by gravity to be discharged from the lower part of the fan casing through the spout.

U.S. Pat. No. 2,663,464

Inventor: Toivo Lahonen

Issued: Dec. 22, 1953

A device for dispensing a poisonous granular mixture consisting of a container for said mixture, a gun having a housing, a flexible connection from said container to said housing and a rotatable impeller within said housing and blocking the path of said mixture therethrough, a discharge tube extending from said housing to covey the mixture from said gun to a discharge point, said impeller comprising a shaft mounted across said housing and a plurality of spiral vanes extending radially from said shaft to substantially fill and block said housing whereby said mixture is lodged between said vanes when it enters said housing and is carried through said housing between said vanes when said impeller is rotated and means to rotate said impeller step by step in predetermined increments to release a predetermined quantity of said mixture from between said vanes to pass into said discharge tube, said means comprising a plurality of lugs on said impeller, a pawl to engage said lugs and a trigger to operate said pawl and cause said impeller to be rotated within said housing predetermined increment each time it is operated.

U.S. Pat. No. 3,174,251

Inventor: John R. West

Issued: Mar. 23, 1965

A blower device for applying dusts such as insecticides and fungicides to plants comprising a storage means for dust, a blower means having a mixing chamber, a mounting spring and oscillatable, vibratory valve device supported on said spring providing intermittent communication between a hopper and said mixing chamber for metering minute quantities of grains of dust.

U.S. Pat. No. 3,304,647

Inventor: George Szekely

Issued: Feb. 21, 1967

A duster device and combination of a tube having an intake end and discharge end for the flow of air therethrough, a downwardly discharging powder sprinkling container, means connecting said tube to said container whereby said container constitutes an upwardly extending branch of said tube; at least part of said connection means being extensible and contractible whereby said container is shakable in relation to said tube, a vibratable armature connected to said container, an electro-magnetic means for actuating said vibratable armature, an air pump connected to discharge into the intake end of the tube and means connecting said vibratable armature to said pump, whereupon actuation of said electromagnetic means, the pump is operated and the container is shaken.

U.S. Pat. No. 4,071,170

Inventor: Rudolph M. Gunzel, Jr., et al.

Issued: Jan. 31, 1978

Powdered material such as insecticide or the like is moved from a hopper by the combined effect of gravity, vibration and induction of a rotary blower for distribution as a gas-powder suspension. The element for vibrating the powder is driven by the blower to induce vibrations in the material along a plurality of different directions. Alternate versions include a canister of material removably located in the hopper, and a container that replaces the hopper and is removably secured to the apparatus.

U.S. Pat. No. 4,089,441

Inventor: John M. Cole, et al.

Issued: May 16, 1978

A portable manually operated domestic-type duster having openings admitting air from behind into the side of its discharge flow adjacent the blower discharge and behind the discharge of the powder chamber to produce Venturi-type mixing action, and also having cooperative metering means in the form of a screen and a cylindrically-shaped wire agitator disposed across the discharge opening of the powder chamber, both the metering means and the blower being driven by single crank mechanism.

U.S. Pat. No. 5,226,567

Inventor: Dominic A. Sansalone

Issued: Jul. 13, 1993

A portable garden power duster for applying dusting agent to garden plants is provided. The power duster comprises an air blower; an air-flow receiving tube removably attached to the an air blower which contains an air baffle attached to the bottom of the tube extending vertically through only a portion of the tube's diameter thereby leaving s space for the passage of air flow through the receiving tube, a positive air duct located at the base of the air baffle on the positive side thereof and a hole located at the base of the air baffle on the negative side thereof; and a dusting agent container removably attached to the bottom of the air-flow receiving tube which contains a lid having an input hole and an output hole and a discharge tube containing a plurality of circumferential holes, wherein the input and output holes of the container lid are in communication with the positive air duct and hole in the air-flow receiving tube and wherein the discharge tube extends vertically from the dusting agent container through both the output hole of the container lid and the hole in the bottom of the air-flow receiving tube and into the air-flow receiving tube on the negative side of the air baffle.

U.S. Pat. No. 5,392,996

Inventor: Frank G. Ussery

Issued: Feb. 28, 1995

A duster attachment includes a closed bottom, upwardly opening cylindrical container. An upright vacuum tube has its lower end secured through the bottom of the container and includes an upper end provided with variable air inlet structure. A closed top and downwardly opening pilot tube is loosely telescoped downwardly over the vacuum tube and includes an annular plate secured about the pilot tube lower end. Dusting powder is disposed within the container below the annular plate and the lower end of the vacuum tube is communicated with the air inlet of a leaf blower.

U.S. Pat. No. 5,964,420

Inventor: Tracy E. Hampton

Issued: Oct. 12, 1999

A new particulate applicator attachment for a leaf blower for applying particulates such as powdered pesticides to a lawn or garden. The inventive device includes an elongate main tube having opposite intake and discharge ends. Each of the ends of the main tube has an opening into the lumen of the main tube. The intake end of the main tube is adapted for attachment to a blower tube of a leaf blower such that the lumen of the main tube is in fluid communication with the blower tube. A container for holding particulates is coupled to the main tube. Provided in the lumen of the main tube are intake and outlet conduits. One end of each of the conduits is connected to the container such that the lumen of the main tube is in fluid communication with the interior of the container through the conduits.

U.S. Pat. No. 5,947,384

Inventor: William H. McCaulley

Issued: Sep. 7, 1999

Apparatus for distributing yard care material is disclosed using a yard blower having a hand held blower tube. A dry material feed system is affixed to a tube section of the blower tube which introduces dry material into an air flow generated by the blower by a feed opening formed in the tube section. An injection gate controls the amount of dry material dispensed from the feed hopper into the air flow. By using a slopping wall, a gravity feed of the dry material is made possible. Additionally, a liquid feed system may be provided which is secured to the dry material feed hopper to feed a liquid yard treatment material also by gravity feed. Advantageously, a liquid feed conduit is formed on the exterior of the blower tube and has an outlet end disposed a distance from the air exit end of the blower tube so that the liquid is injected into the air flow as it exits the blower tube for atomization and distribution to a treatment area. The apparatus may be provided integral with a special tube section which can be sold and interfitted with a blower tube of an existing or new yard blower.

UK Patent Number GB2,195,323

Inventor: Hendrik Arian Dirkse, et al.

Issued: Sep. 16, 1986

An arrangement device for controlling the flow of granular material through a passage, e.g. defined by a pipe comprising members, an annular duct and vertically movable hollow fructoconical member, at least one of which has means for passing a gas through an inclined wall thereof into the passage between the members defined by opposed inclined walls. The inclined walls may be relatively movable or fixed.

While these devices for particulate matter dispensing may be suitable for the purposes for which they were designed, they would not be as suitable for the purposes of the present invention, as hereinafter described.

SUMMARY OF THE PRESENT INVENTION

The present invention discloses a device for attachment to a leaf blower having a conduit with a container having a reservoir with particulate matter therein in communication with the conduit having control means for metering the amount of gravity fed particulate matter dispensed into a pressurized air stream. Also disclosed is a means for attaching a shoulder strap with a flexible conduit extending therefrom whereby the device can be attached to the aforementioned conduit for metering the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more.

A primary object of the present invention is to provide a device for attachment to a leaf blower.

Another object of the present invention is to provide a device for attachment to a leaf blower having a conduit with a container having a reservoir for particulate matter in communication with the conduit.

Yet another object of the present invention is to provide a device for attachment to a leaf blower having control means for metering the amount of gravity fed particulate matter dispensed into a pressurized air stream.

Still yet another object of the present invention is to provide a device for attachment to a leaf blower with a container having means for attaching a shoulder strap with a flexible conduit extending therefrom whereby said device can be attached to the aforementioned conduit for metering the contents of the container into an air stream.

Another object of the present invention is to provide a device for attachment to a leaf blower that both attachable units can be employed for the spread of seeds, dusting gardens, sow seeds for deer food plots, dust fruit trees, orchards, dust and fog under houses, fertilize yards, control poison ivy, insect control and much more.

Additional objects of the present invention will appear as the description proceeds.

The present invention overcomes the shortcomings of the prior art by providing a device for attachment to a leaf blower having a conduit with a container having a reservoir for particulate matter in communication with said conduit having control means for metering the amount of gravity fed particulate matter dispensed into a pressurized air stream. Also a container having means for attaching a shoulder strap with a flexible conduit extending therefrom whereby said device can be attached to the aforementioned conduit for metering the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
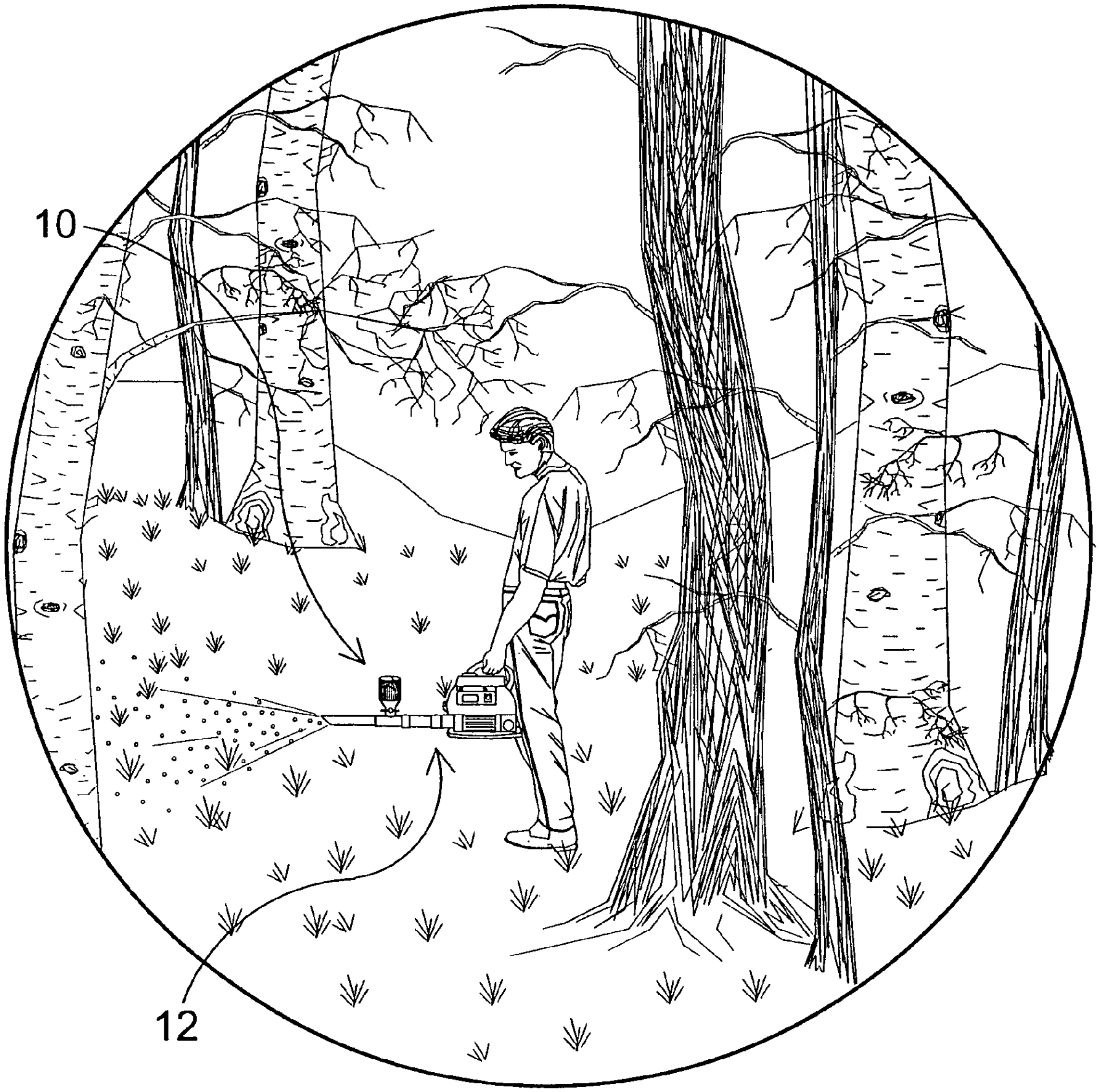
FIG. 1 is an illustrative view of the present invention in use.

With regard to reference numerals used, the following numbering is used throughout the drawings.

10 present invention
12 blower
14 container attachment
16 side pack attachment
18 container
20 cap
22 blower attachment
23 conduit
24 regulator
26 lever
28 blower tube
30 particulate matter
32 pressurized air stream
34 shoulder strap
36 shoulder
38 user
40 back pack
42 flex tube
44 attachment means

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 is a device for attachment to a leaf blower 12 having a conduit with a container having a reservoir with particulate matter in communication with the conduit having control means for metering the amount of gravity fed particulate matter dispensed into a pressurized air stream. Also, a container having means for attaching a shoulder strap with a flexible conduit extending therefrom whereby the device can be attached to the aforementioned conduit for metering the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more.

Figure 2:
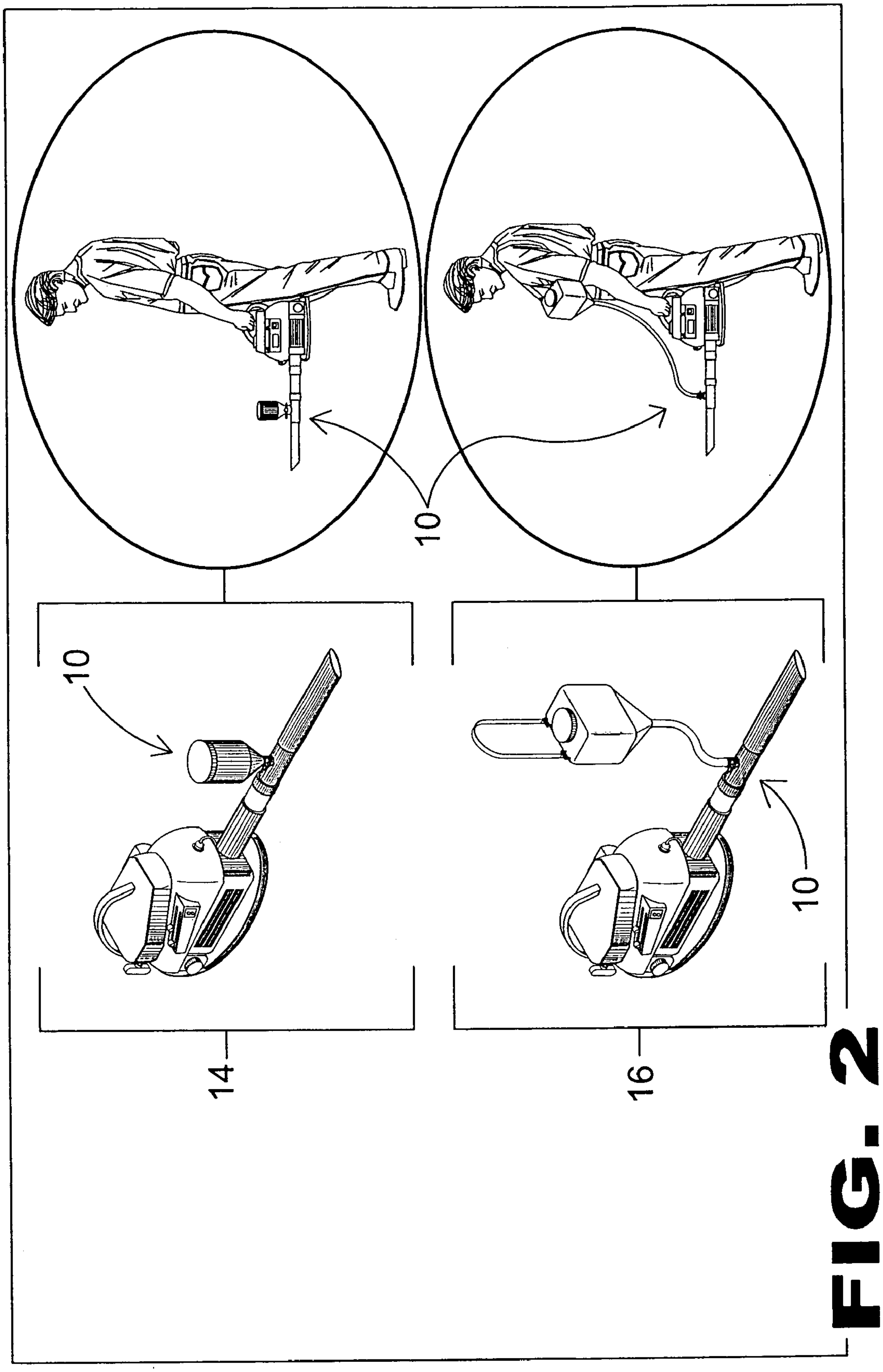
FIG. 2 is a locator chart of the present invention.

Turning to FIG. 2, shown therein is a locator chart of the present invention 10. Shown is a chart of the leaf blower container attachment 14 and leaf blower side pack attachment 16, each indicating the relevant figures related to each unit.

Figure 3:
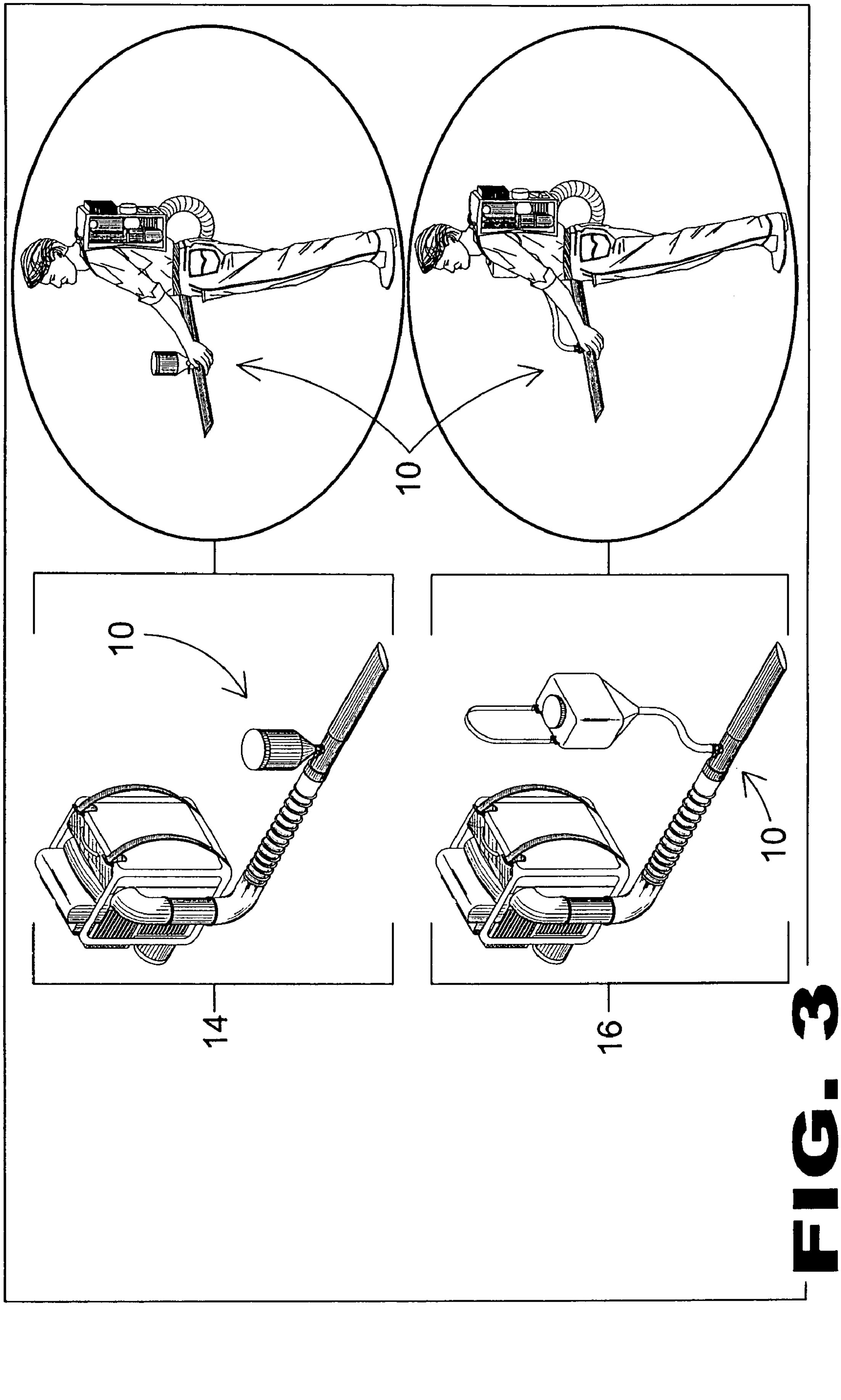
FIG. 3 is a locator chart of the present invention.

Turning to FIG. 3, shown therein is a locator chart of the present invention 10. Shown is a chart of the leaf blower container attachment 14 and leaf blower side pack attachment 16, each indicating the relevant figures related to each unit.

Figure 4:
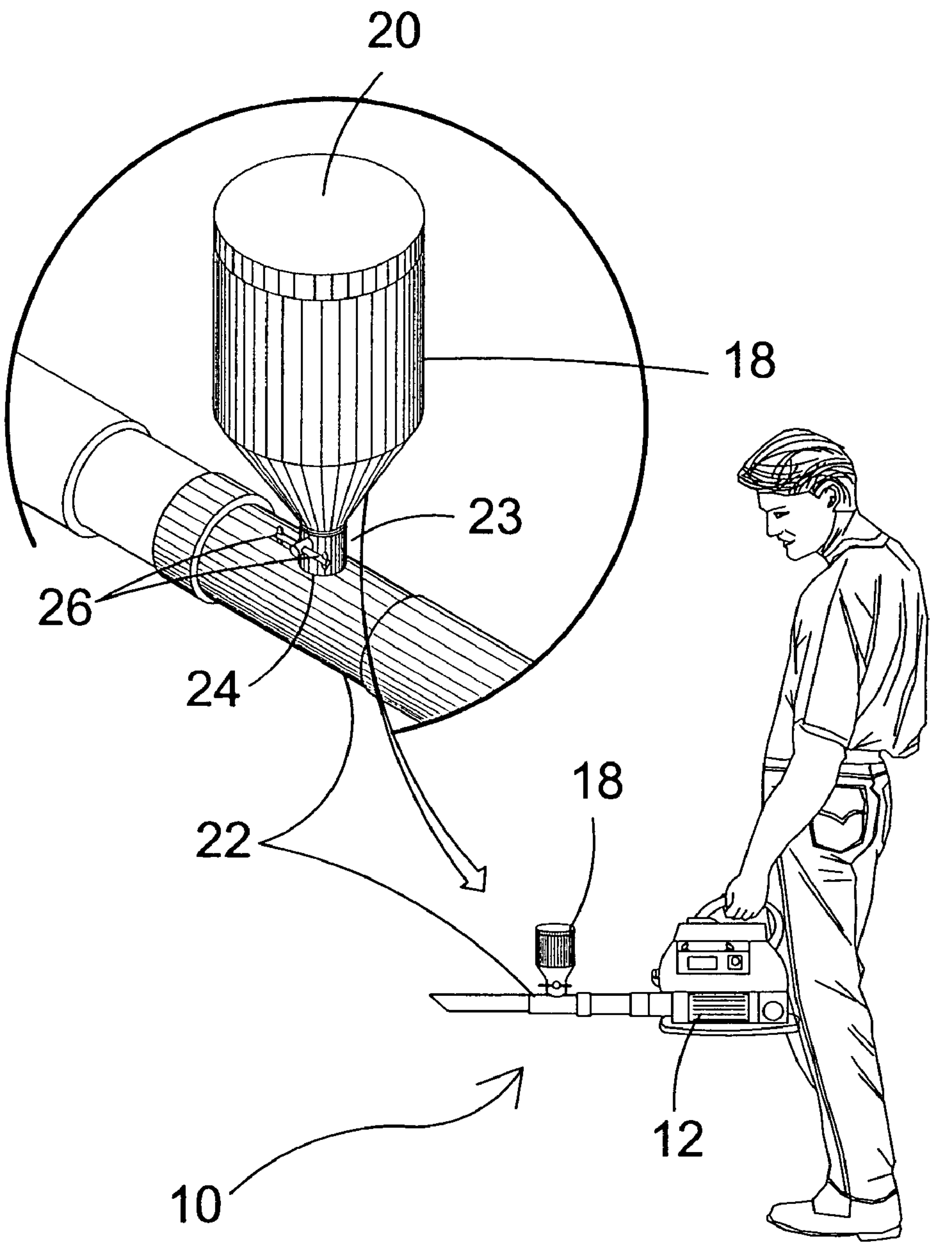
FIG. 4 is an illustrative view of the leaf blower with container attachment of the present invention in use.

Turning to FIG. 4, shown therein is an illustrative view of the leaf blower with container attachment of the present invention 10 in use. The present invention 10 is a device for attachment to a leaf 12 blower having a conduit 23 with a container 18 with fill cap 20 having a reservoir therein with particulate matter in communication with the conduit having control means for metering the amount of gravity fed particulate matter dispensed into a pressurized air stream. The attachable unit can be employed for the spread of seeds, dusting gardens, sow seeds for deer food plots, dust fruit trees, orchards, dust and fog under houses, fertilize yards, control poison ivy, insect control and much more. Shown are the blower attachment 22, regulator 24 and lever 26.

Figure 5:
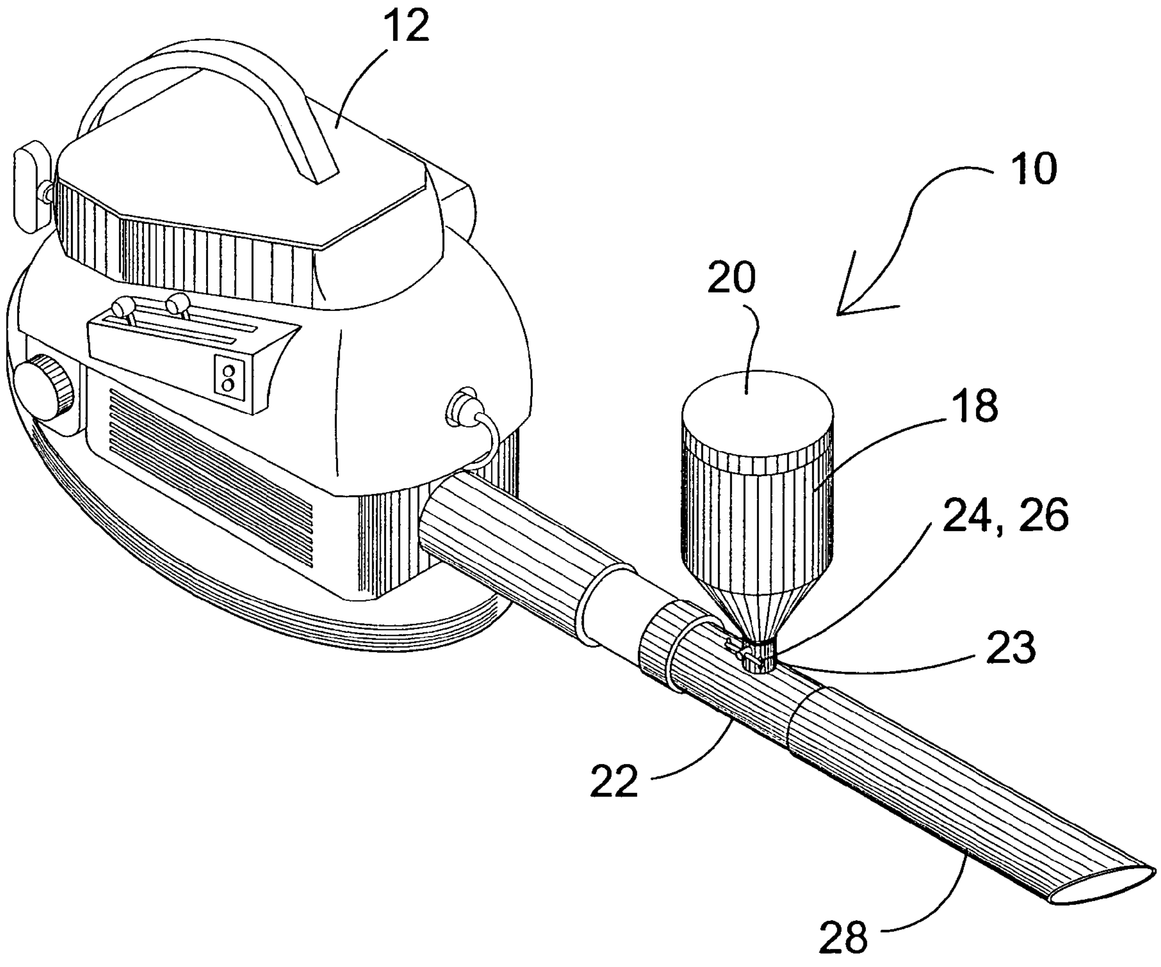
FIG. 5 is a perspective view of the present invention attached to a hand held blower.

Turning to FIG. 5, shown therein is a perspective view of the present invention 10 attached to a hand held blower. Shown is the present invention 10 being a device for attachment to a leaf blower 12 having a conduit 23 with a container 18 with cap 20 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Shown are the blower attachment 22 and blower tube 28.

Figure 6:
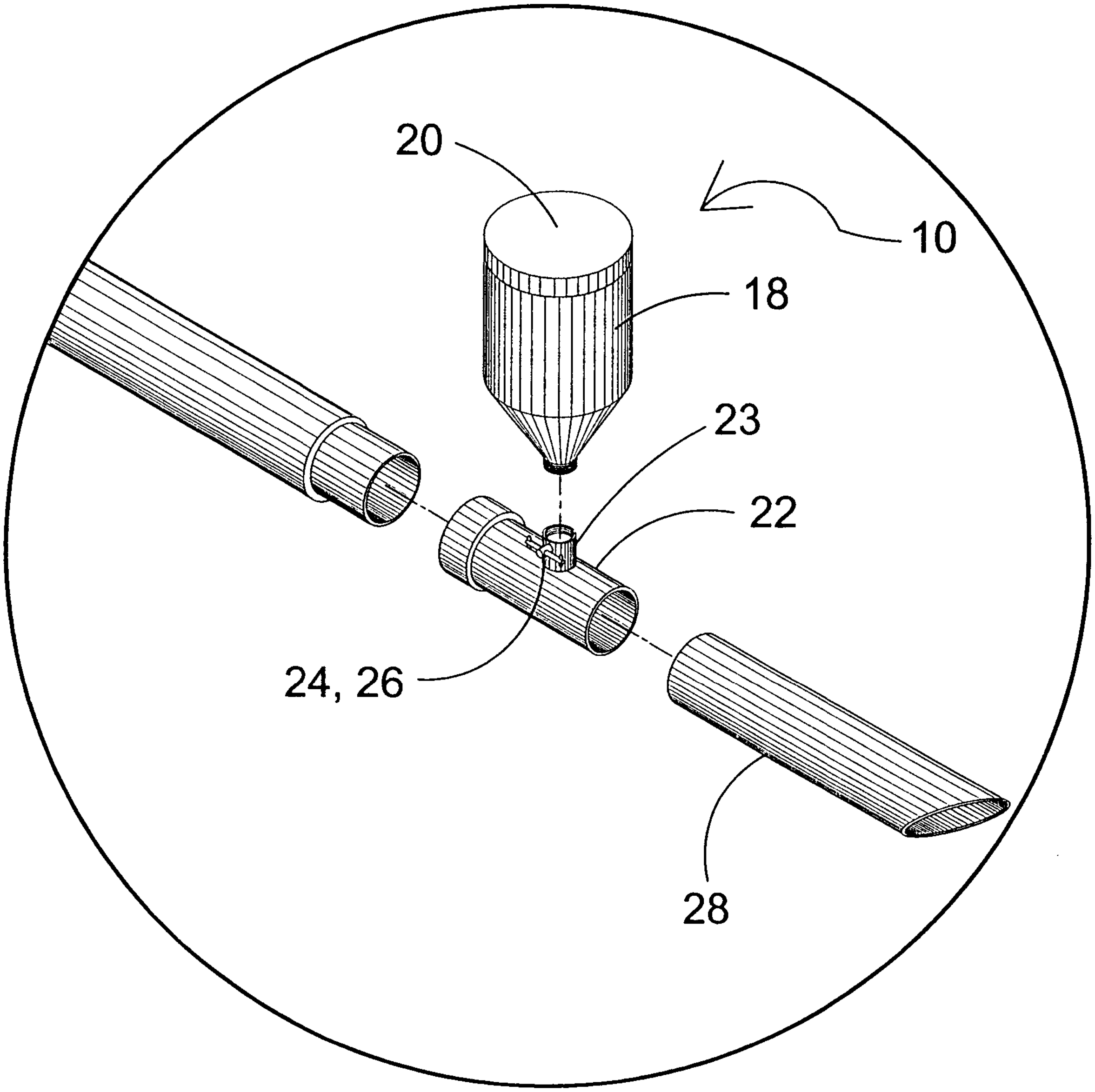
FIG. 6 is a detailed perspective view of the present invention exploded from blower.

Turning to FIG. 6, shown therein is a detailed perspective view of the present invention 10 exploded from blower. Shown is the present invention 10 being a device for attachment to a leaf blower having a conduit 23 and blower attachment 22 between the ends of blower tube 28 with a container 18 with cap 20 thereon having a reservoir therein with particulate matter in communication with the conduit 22 having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Blower tube 28 is also shown.

Figure 7:
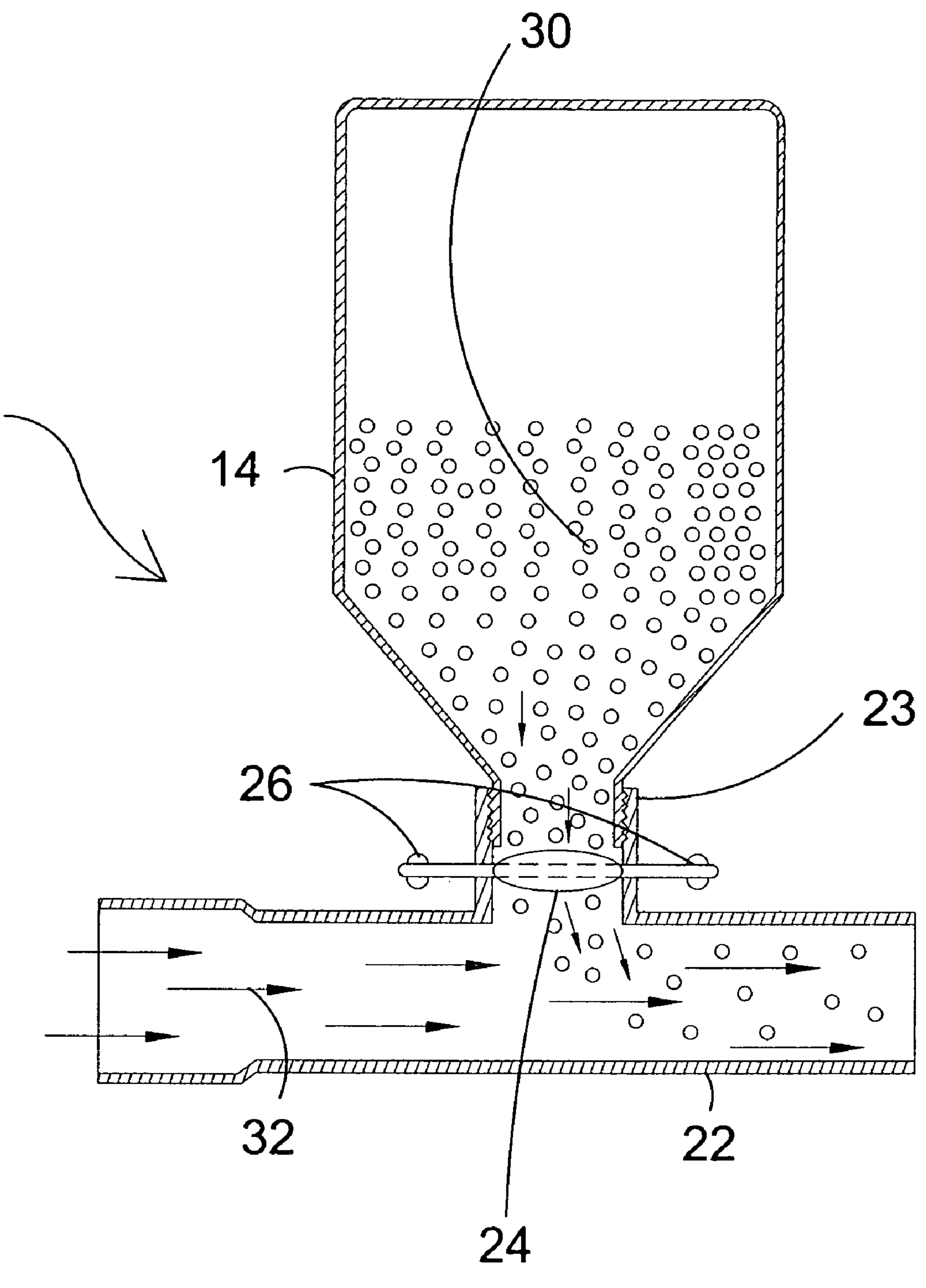
FIG. 7 is a sectional view of the present invention.

Turning to FIG. 7, shown therein is a sectional view of the present invention 10. Shown is the present invention 10 being a device for attachment to a leaf blower having a conduit 23 with a container 14 having a reservoir therein with particulate matter 30 in communication with the conduit having control means 24, 26 for metering the amount of gravity fed particulate matter dispensed into a pressurized air stream 32. This attachable unit can be employed for the spread of seeds, dusting gardens, sow seeds for deer food plots, dust fruit trees, orchards, dust and fog under houses, fertilize yards, control poison ivy, insect control and much more. Blower attachment 22 is also shown.

Figure 8:
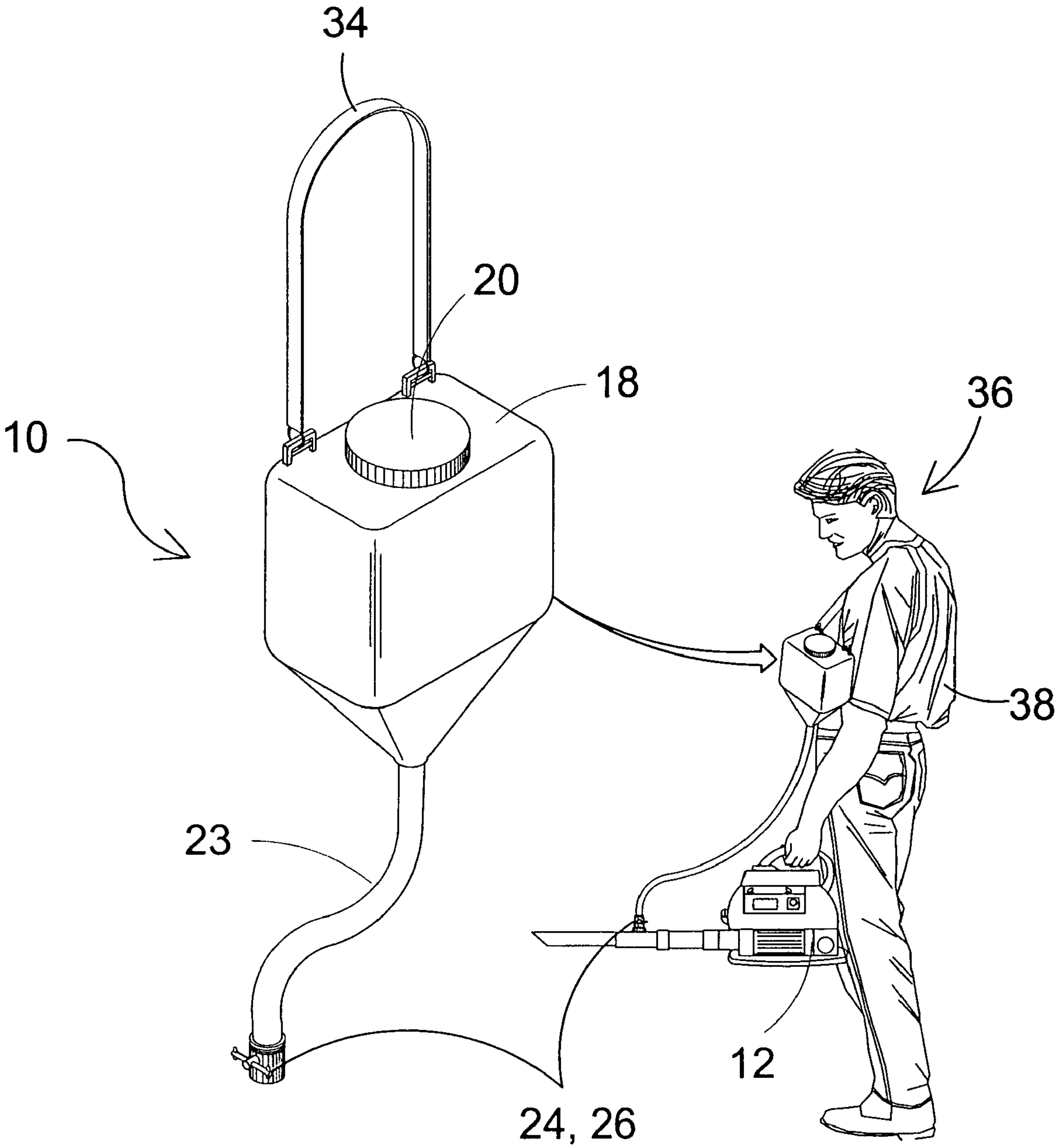
FIG. 8 is an illustrative view of the present invention.

Turning to FIG. 8, shown therein is an illustrative view of the present invention 10. Shown is the present invention 10 being a device for attachment to a leaf blower 12 having a flexible conduit 23 with a container 18 with cap 20 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Shoulder strap 34 is shown for being worn on the shoulder 36 of a user 38.

Figure 9:
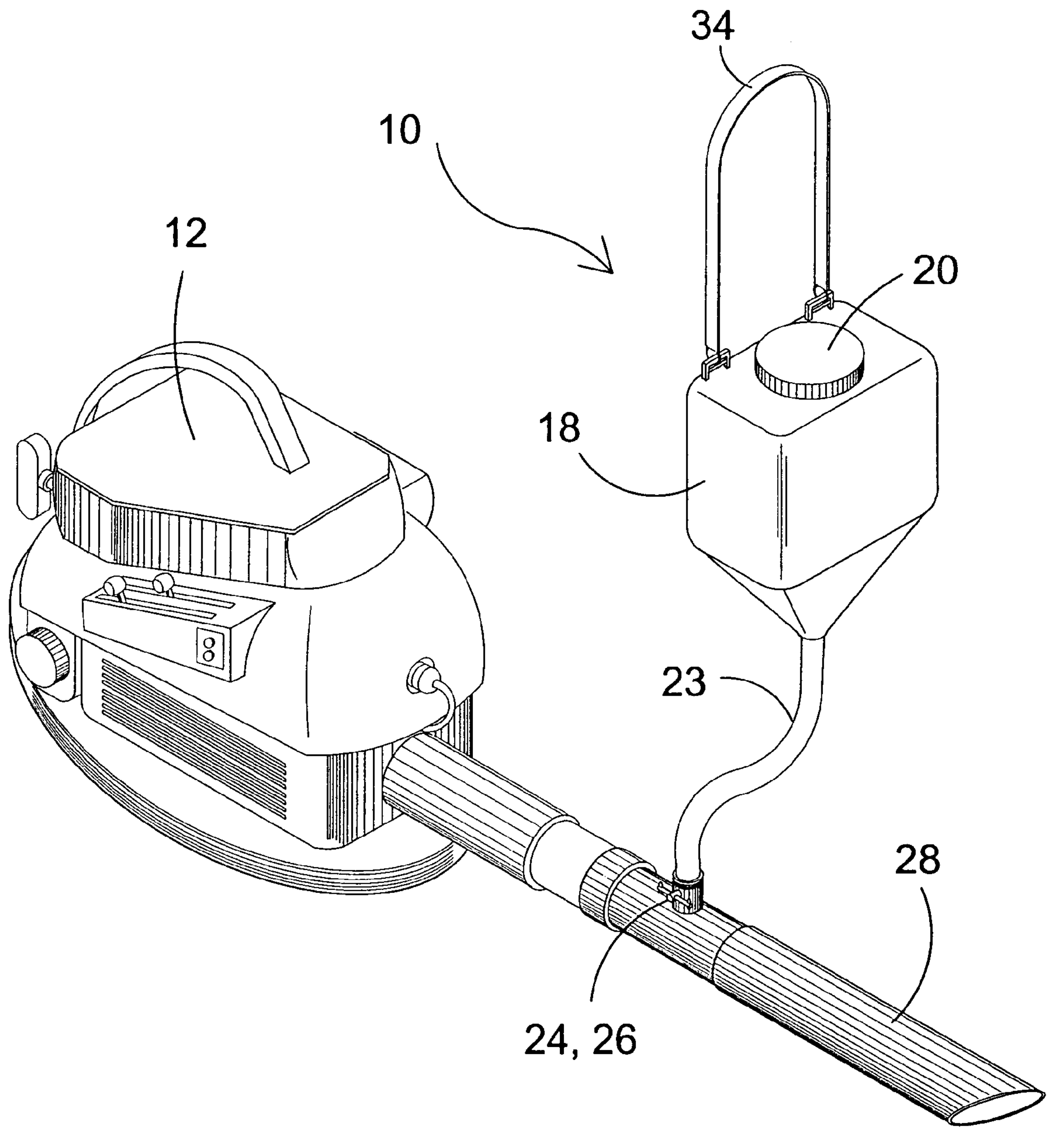
FIG. 9 is a perspective view of the present invention.

Turning to FIG. 9, shown therein is a perspective view of the present invention 10. Shown is the present invention 10 being a device for attachment to a leaf blower 12 having a conduit 23 with a container 18 with cap 20 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Also shown are blower tube 28 and shoulder strap 34.

Figure 10:
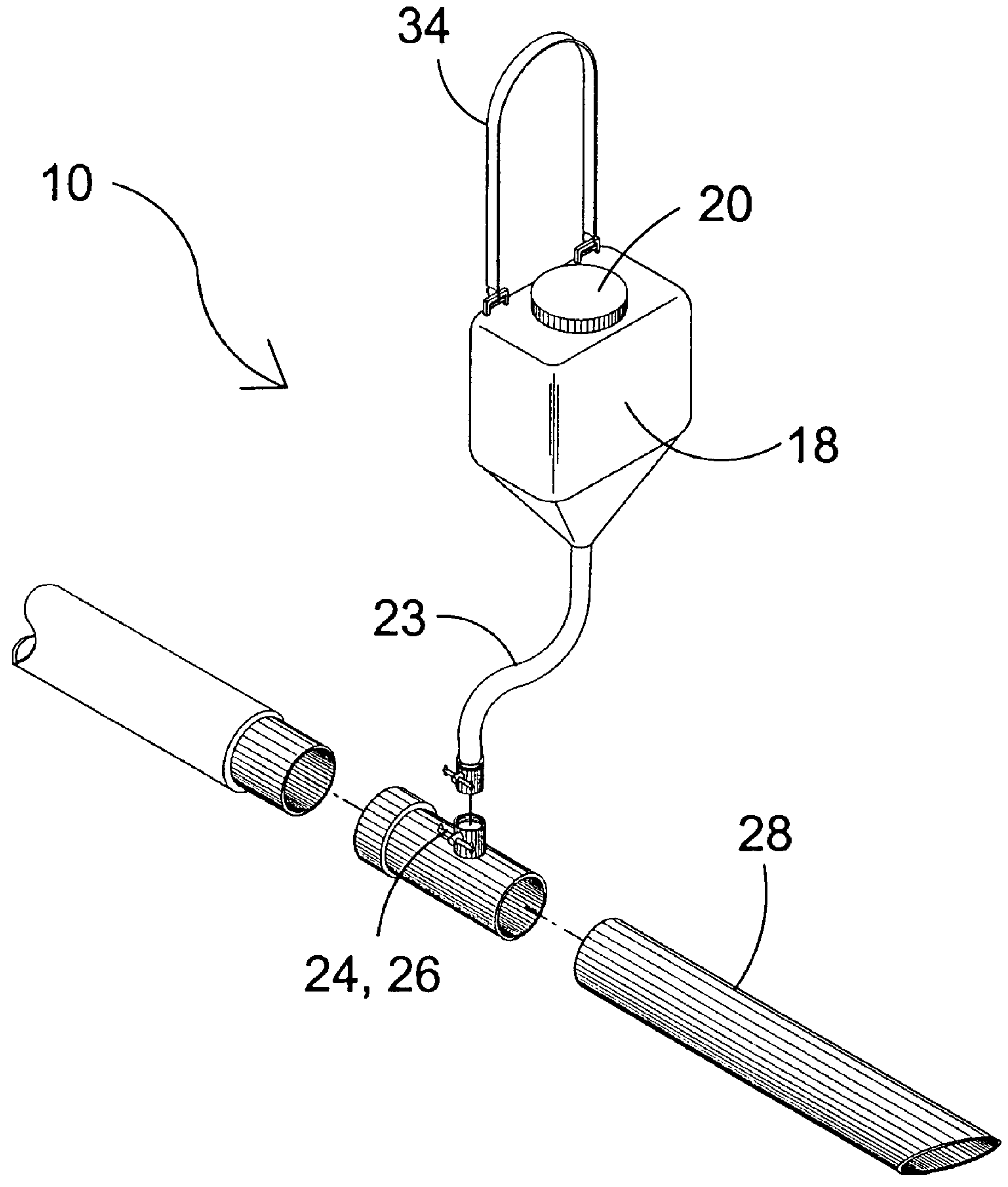
FIG. 10 is a detailed exploded view of the present invention.

Turning to FIG. 10, shown therein is a detailed exploded view of the present invention 10. Shown is the present invention 10 being a device for attachment to a leaf blower having a conduit 23, i.e., a hose, with a container 18 and cap 20 on shoulder strap 34 having a reservoir with particulate matter in communication with the conduit having control means 24, 26 for metering the amount of gravity fed particulate matter dispensed into a pressurized air stream and out blower tube 28. This attachable unit can be employed for the spread of seeds, dusting gardens, sow seeds for deer food plots, dust fruit trees, orchards, dust and fog under houses, fertilize yards, control poison ivy, insect control and much more.

Figure 11:
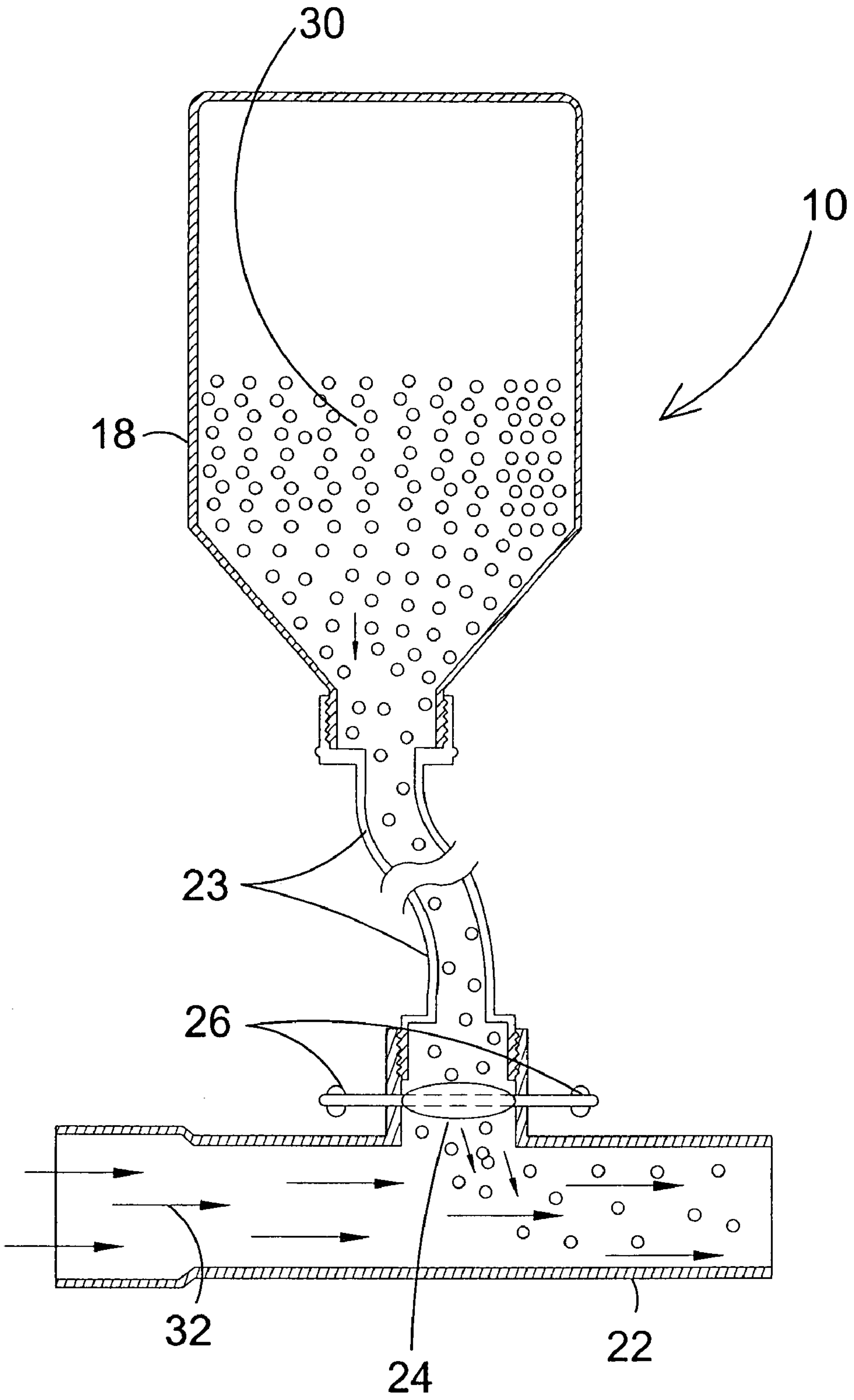
FIG. 11 is a sectional view of the present invention.

Turning to FIG. 11, shown therein is a sectional view of the present invention 10. Shown is the present invention 10 being a device for attachment to a hand held leaf blower having a container 18 having means for attaching a shoulder strap with a flexible conduit 23 extending therefrom whereby the device can be attached to the aforementioned conduit for metering the contents 30 of the container into an air stream 32. Shown are regulator 24, lever 26, and blower attachment 22.

Figure 12:
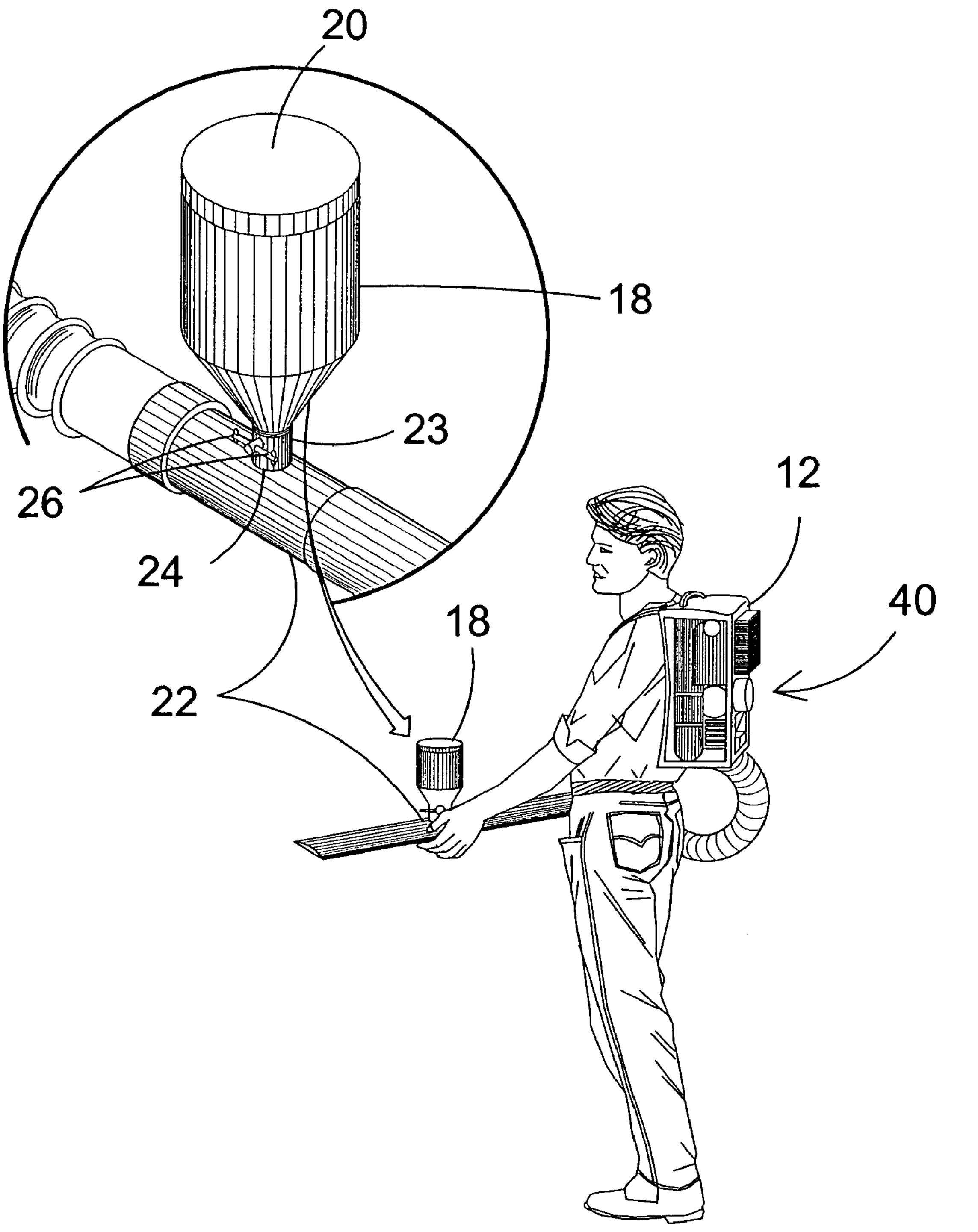
FIG. 12 is an illustrative view of the leaf blower with container attachment of the present invention in use.

Turning to FIG. 12, shown therein is an illustrative view of the leaf blower 12 on back pack 40 with container 18 attachment of the present invention in use. The present invention 10 is a device for attachment to a leaf blower 12 having a conduit 23 with a container 18 and cap 20 having a reservoir with particulate matter in communication with the conduit having control means 24, 26 for metering the amount of gravity fed particulate matter dispensed into a pressurized air stream. The attachable unit can be employed for the spread of seeds, dusting gardens, sow seeds for deer food plots, dust fruit trees, orchards, dust and fog under houses, fertilize yards, control poison ivy, insect control and much more. Shown is blower attachment 22.

Figure 13:
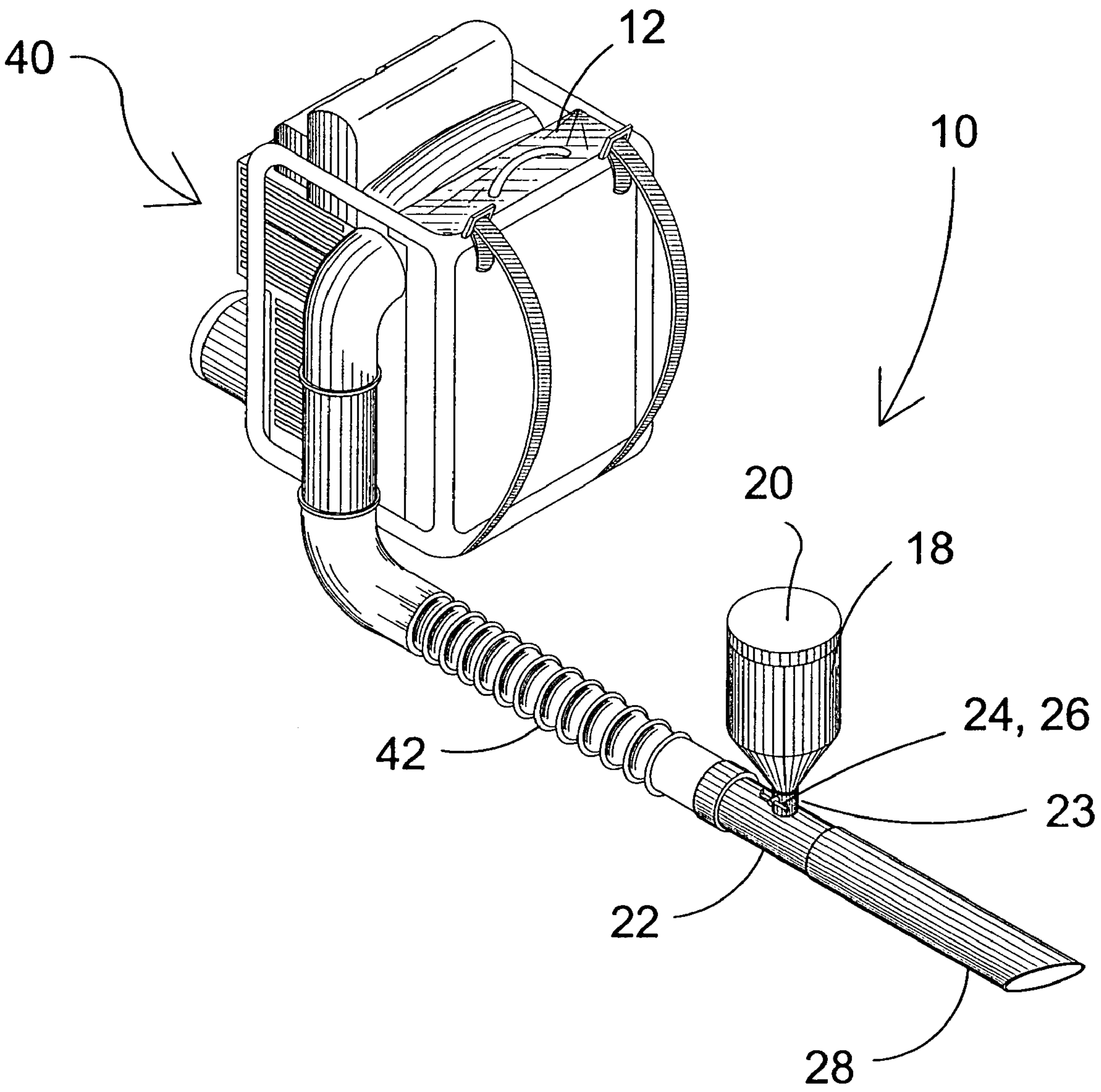
FIG. 13 is a perspective view of the present invention attached to a hand held blower.

Turning to FIG. 13, shown therein is a perspective view of the present invention 10 attached to a hand held blower 12 on back pack 40. Shown is the present invention 10 being a device for attachment to a leaf blower 12 having a conduit 23 with a container 18 and cap 20 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Also shown are flex tube 42, blower attachment 22 and blower tube 28.

Figure 14:
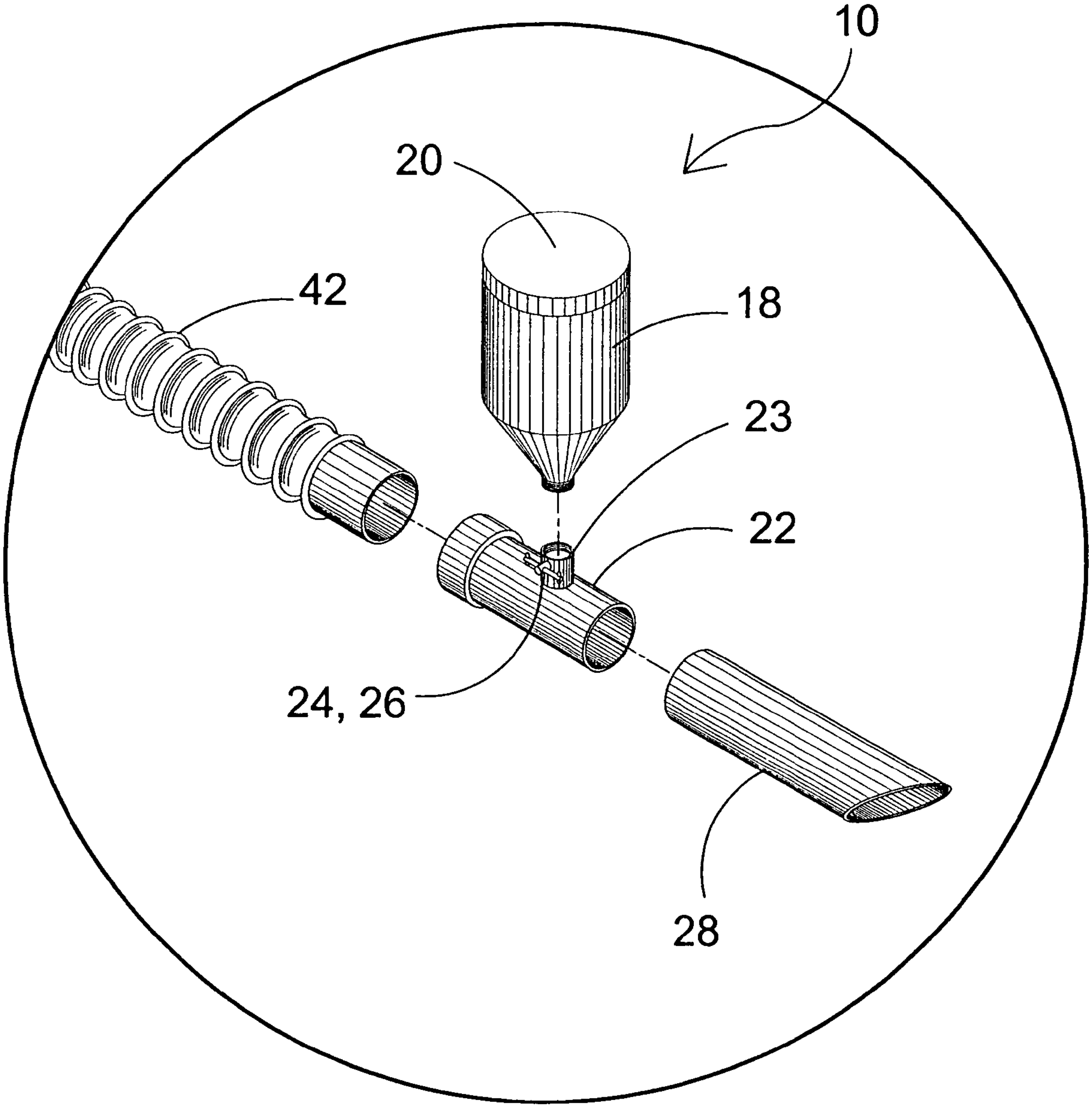
FIG. 14 is a detailed perspective view of the present invention exploded from blower.

Turning to FIG. 14, shown therein is a detailed perspective view of the present invention 10 exploded from blower. Shown is the present invention 10 being a device for attachment to a leaf blower having a conduit 23 with a container 18 and fill cap 20 having a reservoir with particulate matter in communication with the conduit having control means 24, 26 for metering the amount of gravity fed particulate matter dispensed into a pressurized air stream and out blower tube 28. This attachable unit can be employed for the spread of seeds, dusting gardens, sow seeds for deer food plots, dust fruit trees, orchards, dust and fog under houses, fertilize yards, control poison ivy, insect control and much more. Also shown is flex tube 42 and blower attachment 22.

Figure 15:
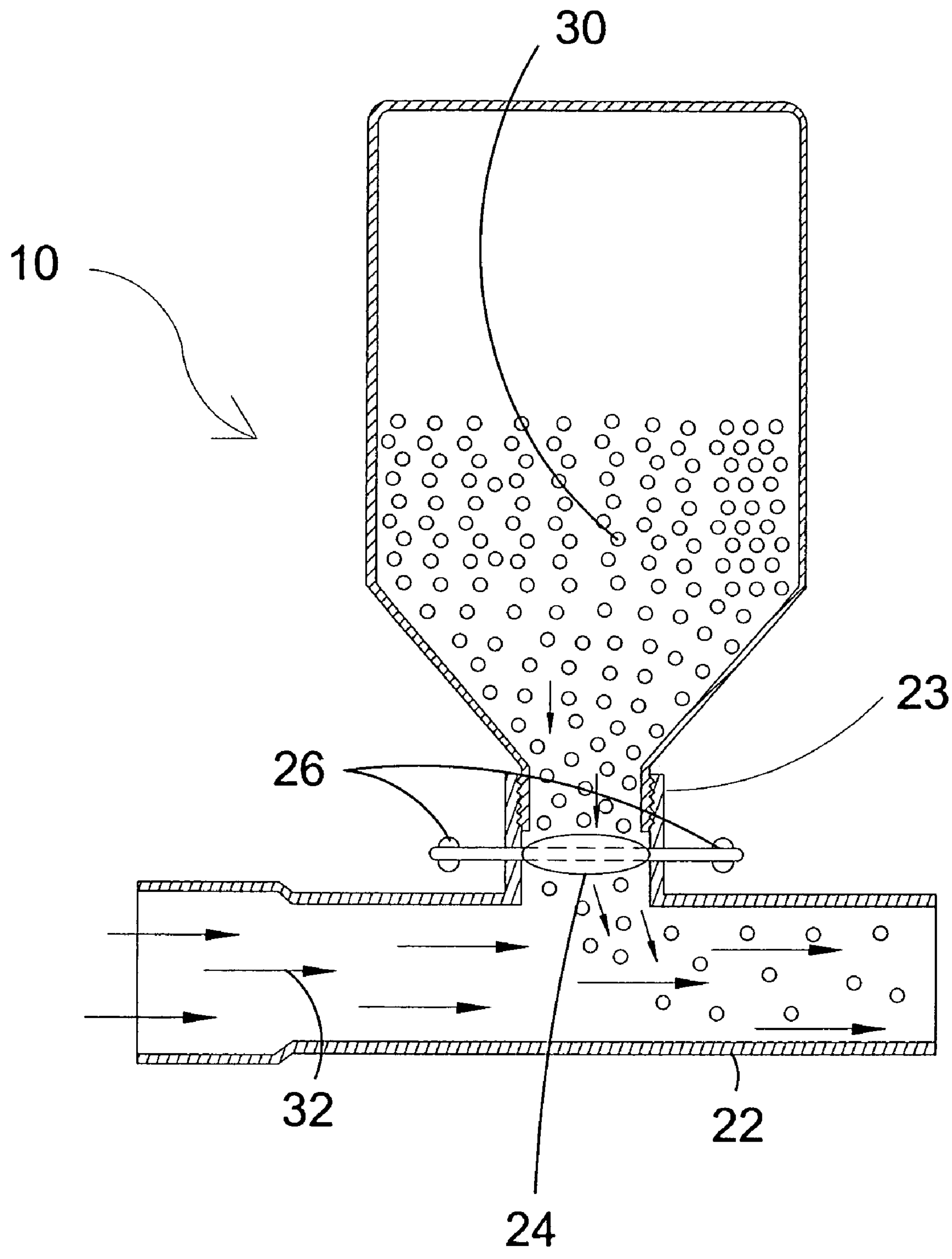
FIG. 15 is a sectional view of the present invention.

Turning to FIG. 15, shown therein is a sectional view of the present invention 10. Shown is the present invention 10 being a device for attachment to a leaf blower having a conduit 23 with a container 18 having a reservoir with particulate matter 30 in communication with the conduit having control means 24, 26 for metering the amount of gravity fed particulate matter dispensed into a pressurized air stream 32. This attachable unit can be employed for the spread of seeds, dusting gardens, sow seeds for deer food plots, dust fruit trees, orchards, dust and fog under houses, fertilize yards, control poison ivy, insect control and much more. Also shown is blower attachment 22.

Figure 16:
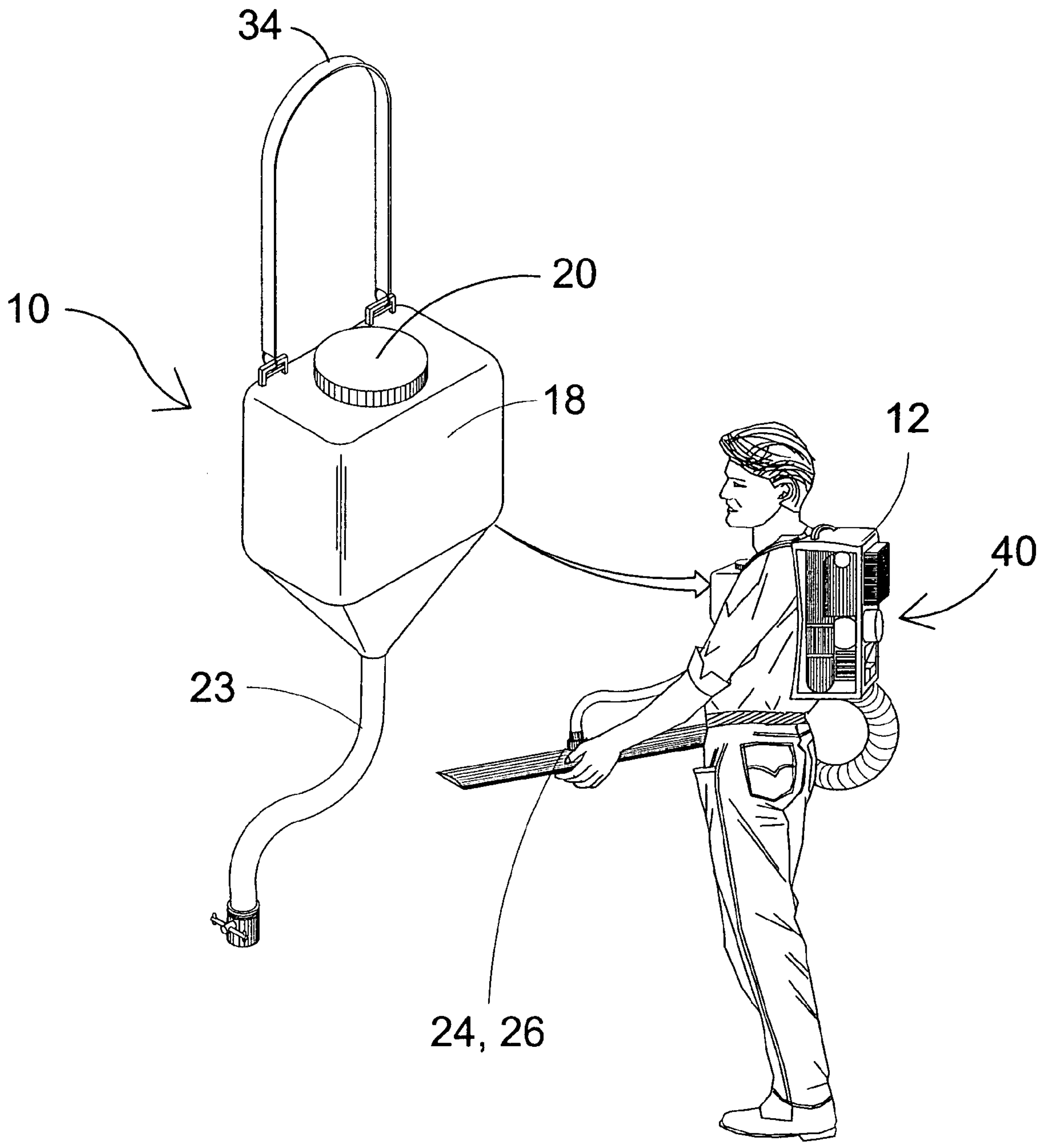
FIG. 16 is an illustrative view of the present invention.

Turning to FIG. 16, shown therein is an illustrative view of the present invention 10. Shown is the present invention 10 being a device for attachment to a leaf blower 12 on back pack 40 having a conduit 23 with a container 18 and cap 20 on shoulder strap 34 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more.

Figure 17:
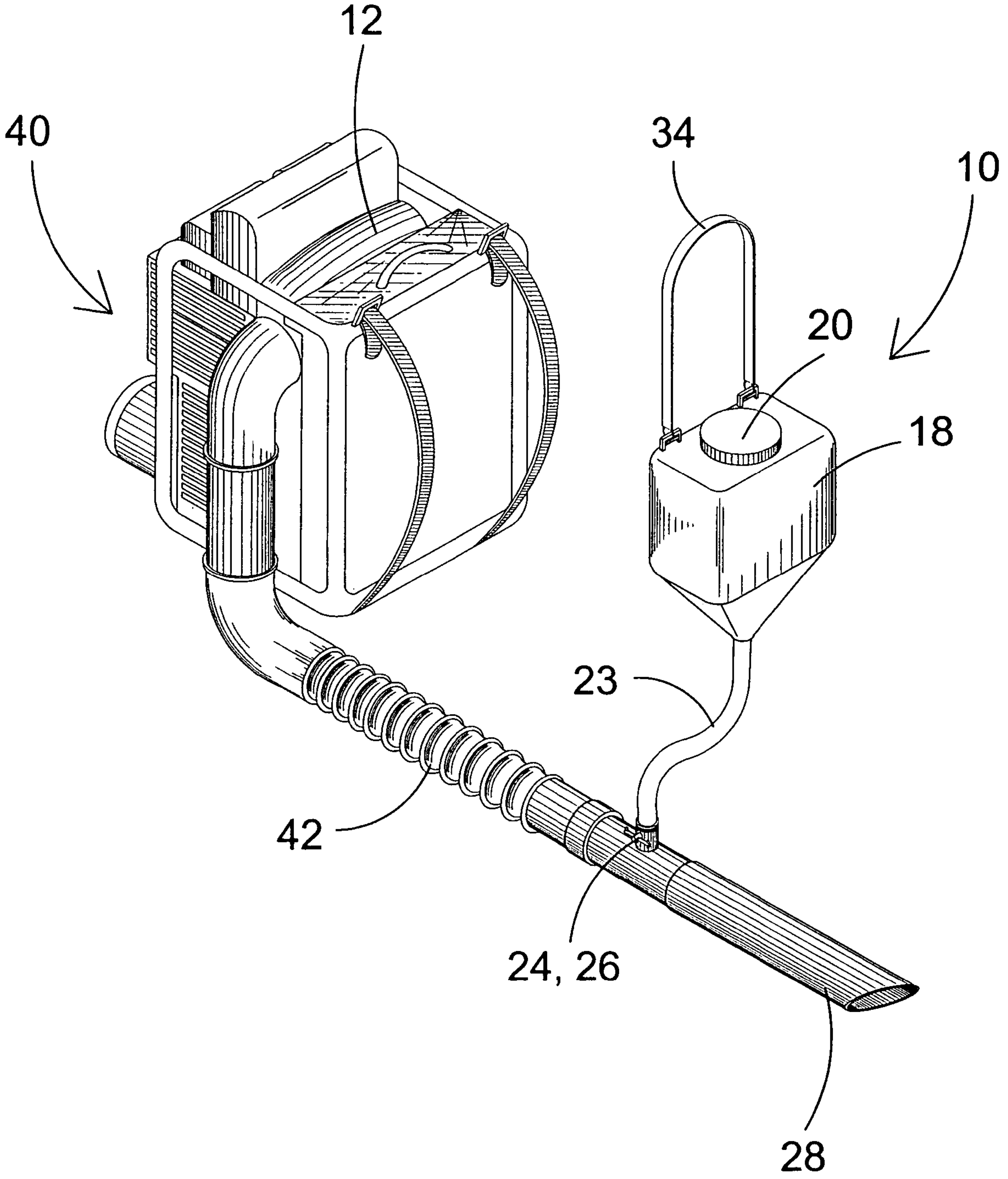
FIG. 17 is a perspective view of the present invention.

Turning to FIG. 17, shown therein is a perspective view of the present invention 10. Shown is the present invention 10 being a device for attachment to a leaf blower 12 on back pack 40 having a conduit 23 with a container 18 and cap 20 having a reservoir with particulate matter in communication with the conduit having control means 24, 26 for metering the amount of gravity fed particulate matter dispensed into a pressurized air stream. This attachable unit can be employed for the spread of seeds, dusting gardens, sow seeds for deer food plots, dust fruit trees, orchards, dust and fog under houses, fertilize yards, control poison ivy, insect control and much more. Also shown are shoulder strap 34, flex tube 42 and air blower tube 28.

Figure 18:
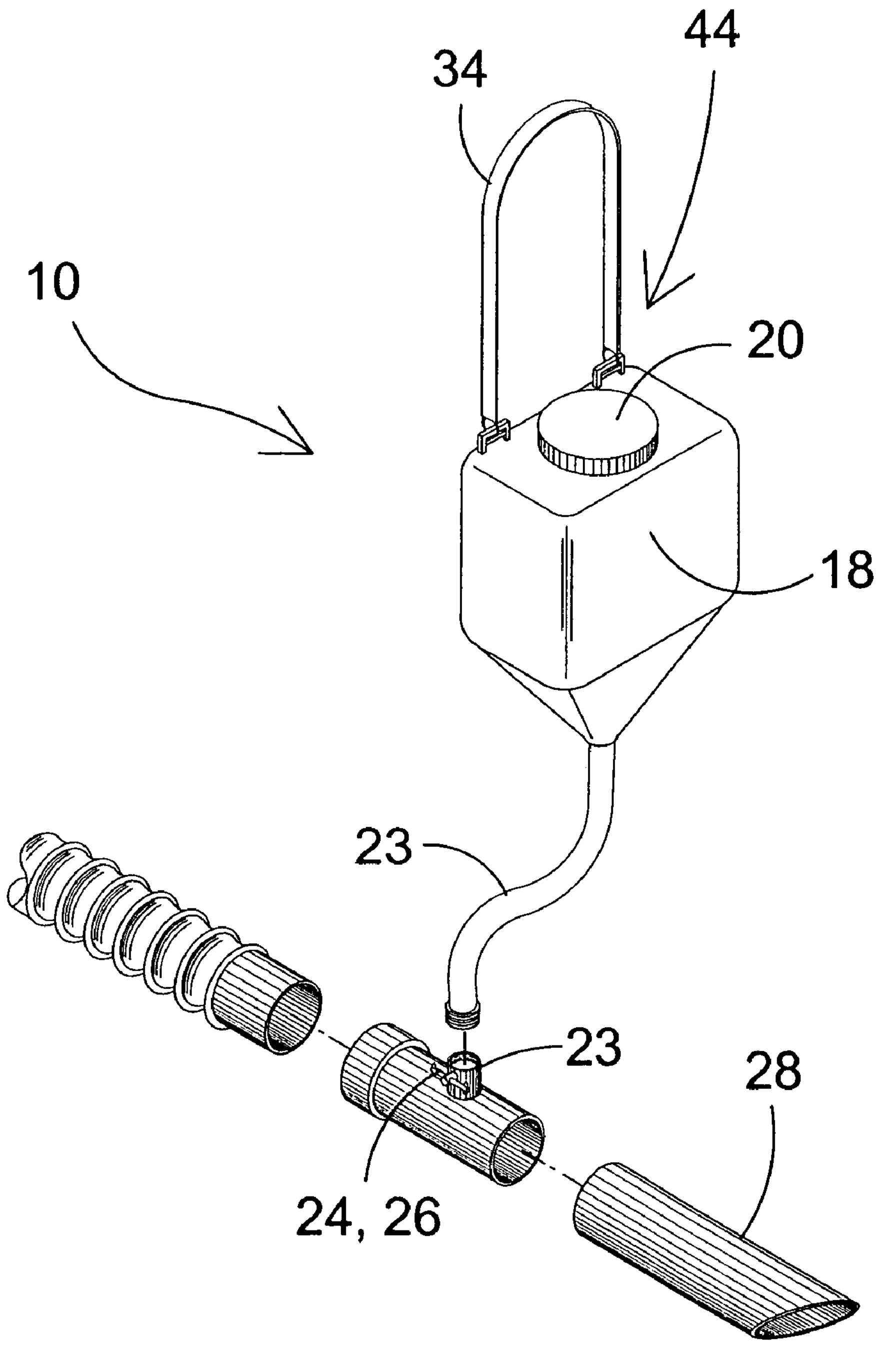
FIG. 18 is a detailed exploded view of the present invention.

Turning to FIG. 18, shown therein is a detailed exploded view of the present invention 10. Shown is the present invention 10 being a device for attachment to a leaf blower having a conduit 23 with a container 18 with cap 20 having means 44 for attaching a shoulder strap 34 with a flexible conduit extending therefrom whereby the device can be attached to the aforementioned conduit for metering by means 24, 26 the contents of the container into an air stream. Both attachable units can be employed for the spread of seeds, dusting gardens, sow seeds for deer food plots, dust fruit trees, orchards, dust and fog under houses, fertilize yards, control poison ivy, insect control and much more. Also shown is blower tube 28.

Figure 19:
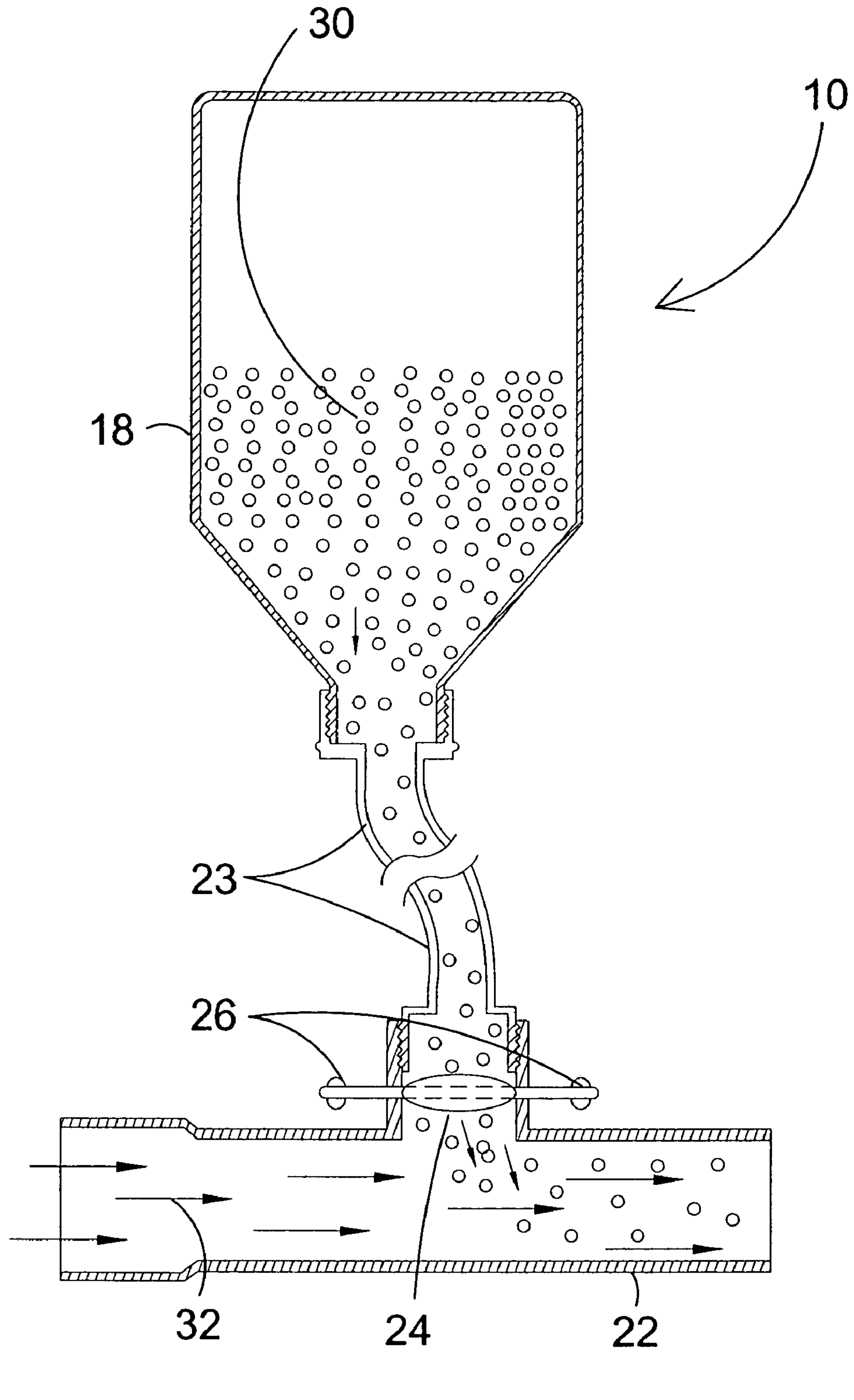
FIG. 19 is a sectional view of the present invention.

Turning to FIG. 19, shown therein is a sectional view of the present invention 10. Shown is the present invention 10 being a device for attachment to a leaf blower having a container 18 with means for attaching a shoulder strap with a flexible conduit 23 extending therefrom whereby the device can be attached to the aforementioned conduit for metering by means 24, 26 the contents of the container into an air stream 32. Also shown are particulate matter 30 and blower attachment 22.

I claim:

1. An apparatus for use with a portable leaf blower for applying particulate matter to an area, in combination comprising:

a) a portable leaf blower with an exhaust tube and an elongated blower tube to permit pressurized air to exit from said leaf blower, said leaf blower tube having first and second opposing ends, said first end being oriented toward said leaf blower, b) a blower attachment for connecting the exhaust tube to said blower tube;

c) a container being disposed on and threaded into a conduit extending out of a side of said blower attachment, said container for receiving therein particulate matter, said container having a removably fixed cap thereon to permit particulate matter to be placed in the container, said container being positioned for gravity feed of the particulate matter in said container to said blower tube; and, d) a butterfly valve in said conduit with a shaft extending out both ends of said conduit for rotating said butterfly valve for metering the amount of particulate matter fed into said blower tube from said container to permit particulate matter to be spread by the leaf blower.

2. The apparatus of claim 1, wherein said leaf blower is sized to be held in the hands of a user.

3. The apparatus of claim 2, wherein said leaf blower is contained in a backpack to be worn by a user.

4. The apparatus of claim 3, wherein said blower attachment is a cylindrical tube being complementarily sized as said blower tube.

5. An apparatus for use with a portable leaf blower for applying particulate matter to an area, in combination, consisting of:

a) a portable leaf blower, said leaf blower having an exhaust tube and an elongated blower tube to permit pressurized air to exit from said leaf blower, said leaf blower tube having first and second opposing ends, said first end being oriented toward said leaf blower, b) a blower attachment for connecting the exhaust tube to said blower tube;

c) a container having a top and a bottom end, said container for receiving therein particulate matter, said container having a removably fixed cap thereon to permit particulate matter to be placed in the container, d) a strap being disposed on said container to be worn by a user;

e) a flexible conduit having first and second opposing ends, said first end being connected to said container and said second end being connected to said blower attachment to permit particulate matter to flow from the container by gravity to the blower attachment; and, f) a butterfly valve having a rotatable flat member in said second end of said flexible conduit for metering the amount of particulate matter fed into said blower tube from said flexible conduit to permit particulate matter to be spread by the leaf blower.

6. The apparatus of claim 5, wherein said leaf blower is sized to be held in the hands of a user.

7. The apparatus of claim 6, wherein said leaf blower is contained in a backpack to be worn by a user.

8. The apparatus of claim 7, wherein said blower attachment is a cylindrical tube being complementarily sized as said blower tube.

9. The apparatus of claim 7, wherein said butterfly valve includes at least one external lever being disposed on said butterfly valve to permit a user to adjust the flow of particulate matter from said container into said blower attachment regulator.

* * * * *